(12) United States Patent
Miller

(10) Patent No.: US 6,412,443 B1
(45) Date of Patent: Jul. 2, 2002

(54) DOUBLE PET WHEEL ACTIVITY DEVICE

(75) Inventor: Michael Miller, Baroda, MI (US)

(73) Assignee: Prevue Pet Products, Inc., Chicago, IL (US)

(*) Notice: Subject to any disclaimer, the term of this patent is extended or adjusted under 35 U.S.C. 154(b) by 0 days.

(21) Appl. No.: 09/524,072

(22) Filed: Mar. 13, 2000

(51) Int. Cl.⁷ .................... A01K 15/02; A01D 15/00
(52) U.S. Cl. ........................ 119/704; 119/700
(58) Field of Search ................. 119/700, 701, 119/702, 703, 704; D30/160; 472/44, 45, 46

(56) References Cited

U.S. PATENT DOCUMENTS

| | | | |
|---|---|---|---|
| 2,249,076 A | 7/1941 | Courtney | 472/30 |
| 2,437,000 A * | 3/1948 | McBride | 472/46 |
| 2,640,460 A | 6/1953 | Siegel | 119/455 |
| D220,571 S | 4/1971 | Rosenberg | D30/160 |
| 3,682,477 A | 8/1972 | Harkins | 119/702 |
| 3,788,277 A | 1/1974 | Winninger et al. | 119/700 |
| 3,869,119 A * | 3/1975 | Oxley | 472/45 |
| D236,513 S | 8/1975 | Palmer | D30/160 |
| D237,391 S | 10/1975 | Willinger et al. | D30/160 |
| 3,933,126 A | 1/1976 | Gordon | 119/700 |
| D240,306 S | 6/1976 | Suchowski et al. | D30/160 |
| D240,307 S | 6/1976 | Suchowski et al. | D30/160 |
| 3,994,262 A * | 11/1976 | Suchowski et al. | 119/700 |
| 3,998,187 A * | 12/1976 | Rodemeyer | 119/700 |
| D244,474 S | 5/1977 | Yamazaki | D30/160 |
| 4,064,839 A | 12/1977 | Rodemeyer et al. | 119/700 |
| 4,498,421 A | 2/1985 | Lovitt | 119/700 |
| 5,186,122 A * | 2/1993 | Philips et al. | 119/702 |
| D360,713 S | 7/1995 | Schiefer et al. | D30/160 |

* cited by examiner

Primary Examiner—Charles T. Jordan
Assistant Examiner—Elizabeth Shaw
(74) Attorney, Agent, or Firm—Michael Best & Friedrich, LLC

(57) ABSTRACT

A small animal activity device having at least two play elements at opposite ends of a pivoting arm and a hollow support member which provides access to the play elements for physically and mentally stimulating small animals.

9 Claims, 9 Drawing Sheets

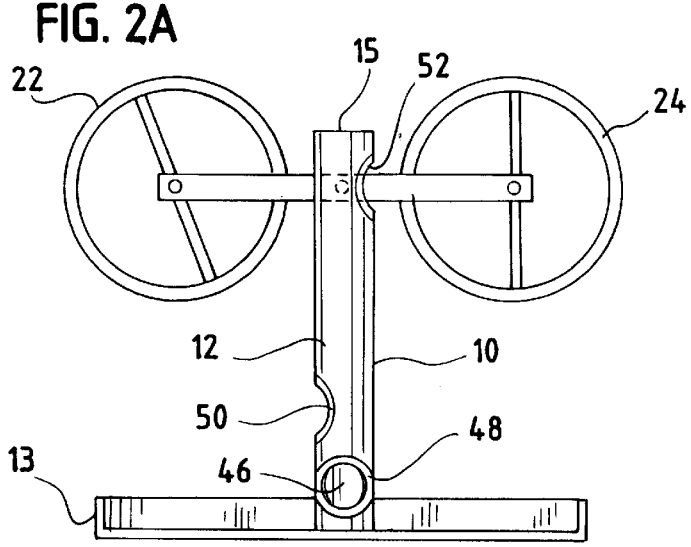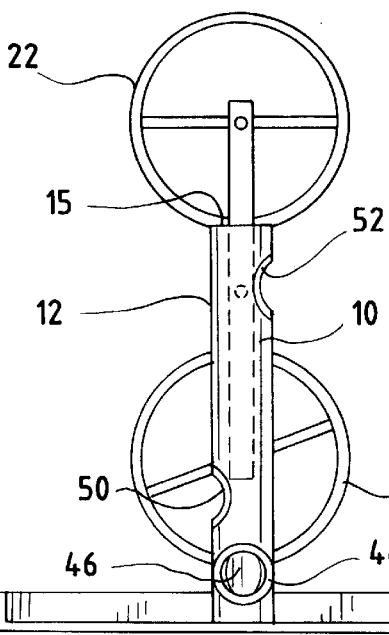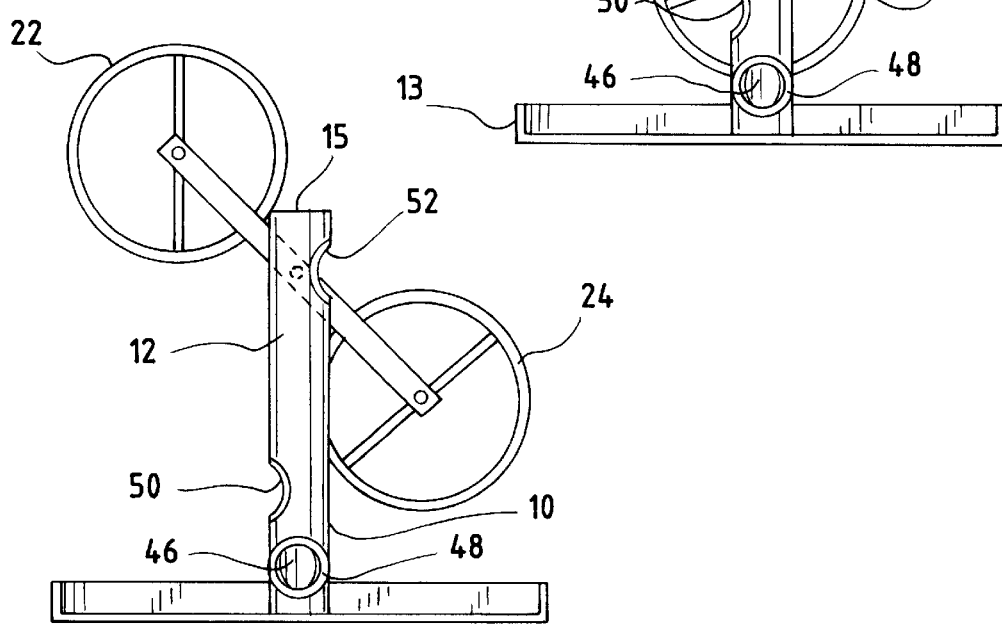

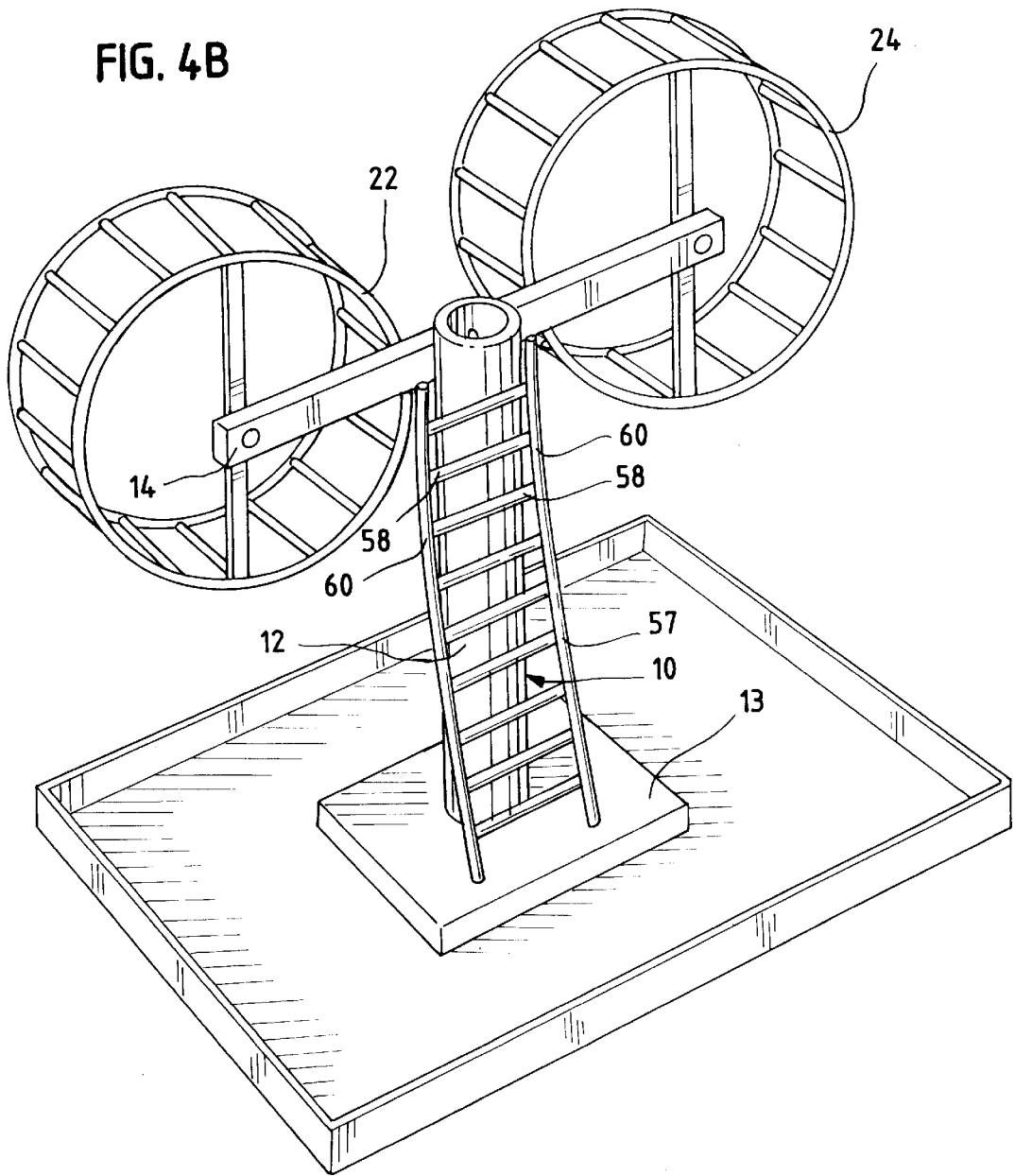

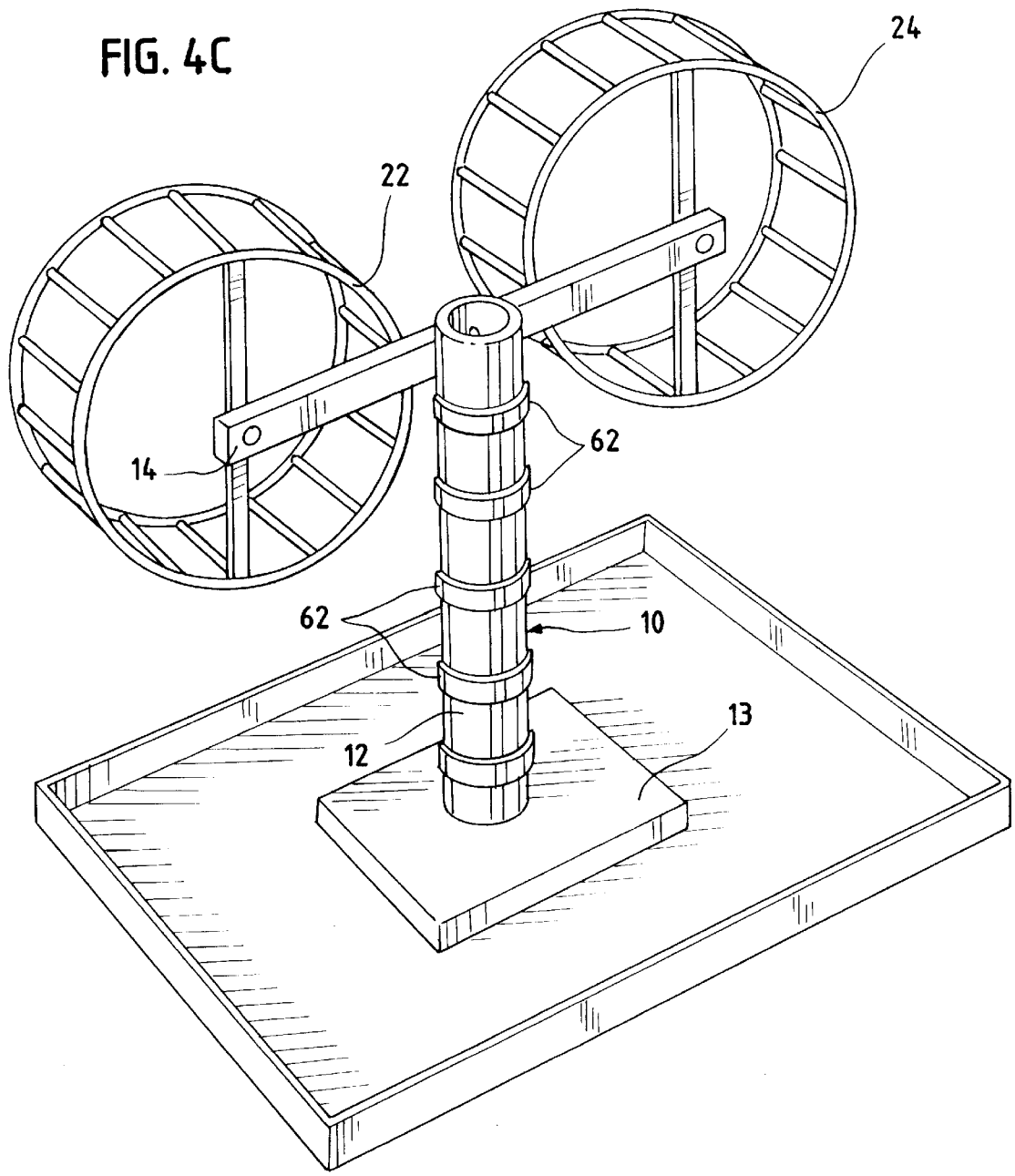

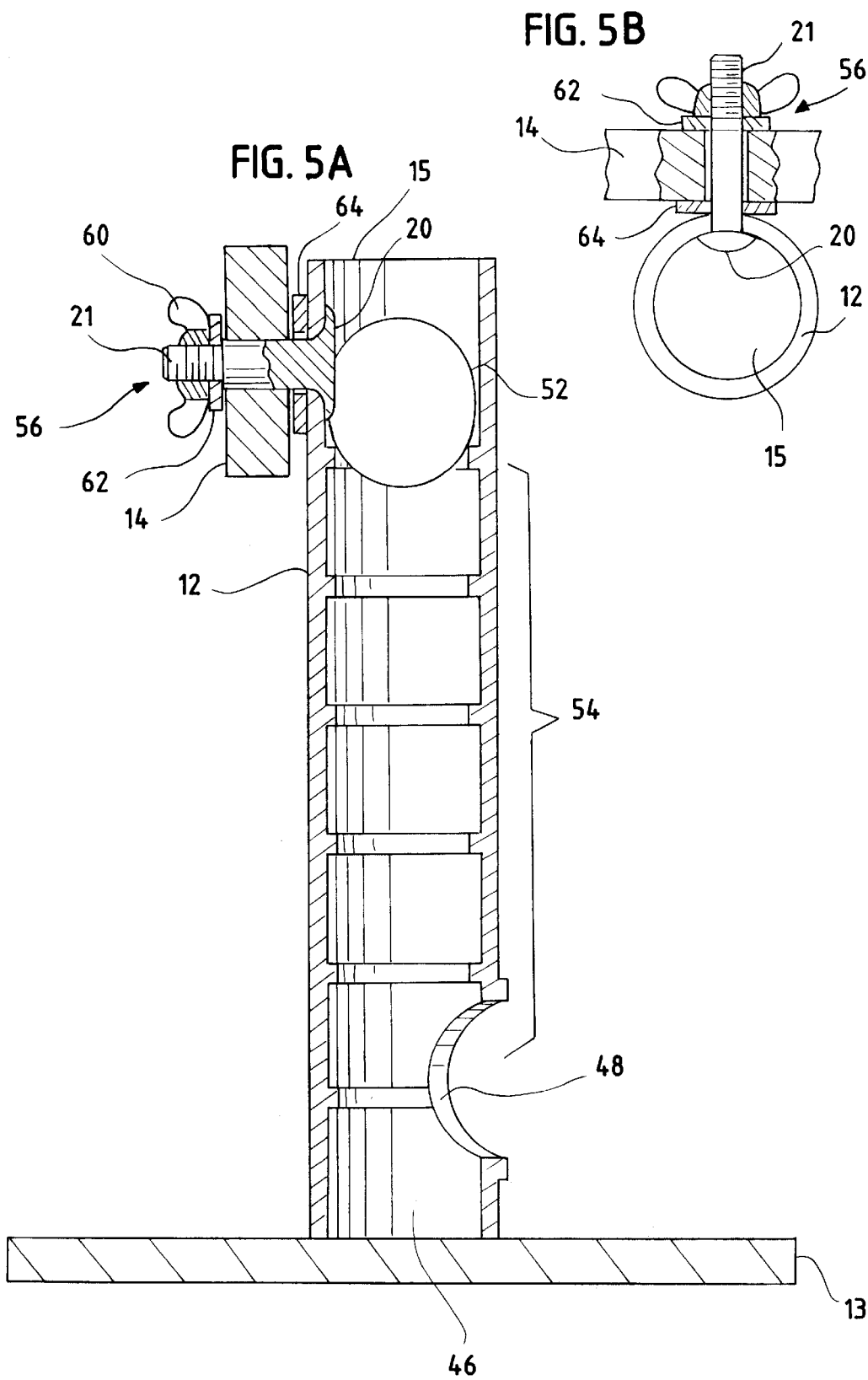

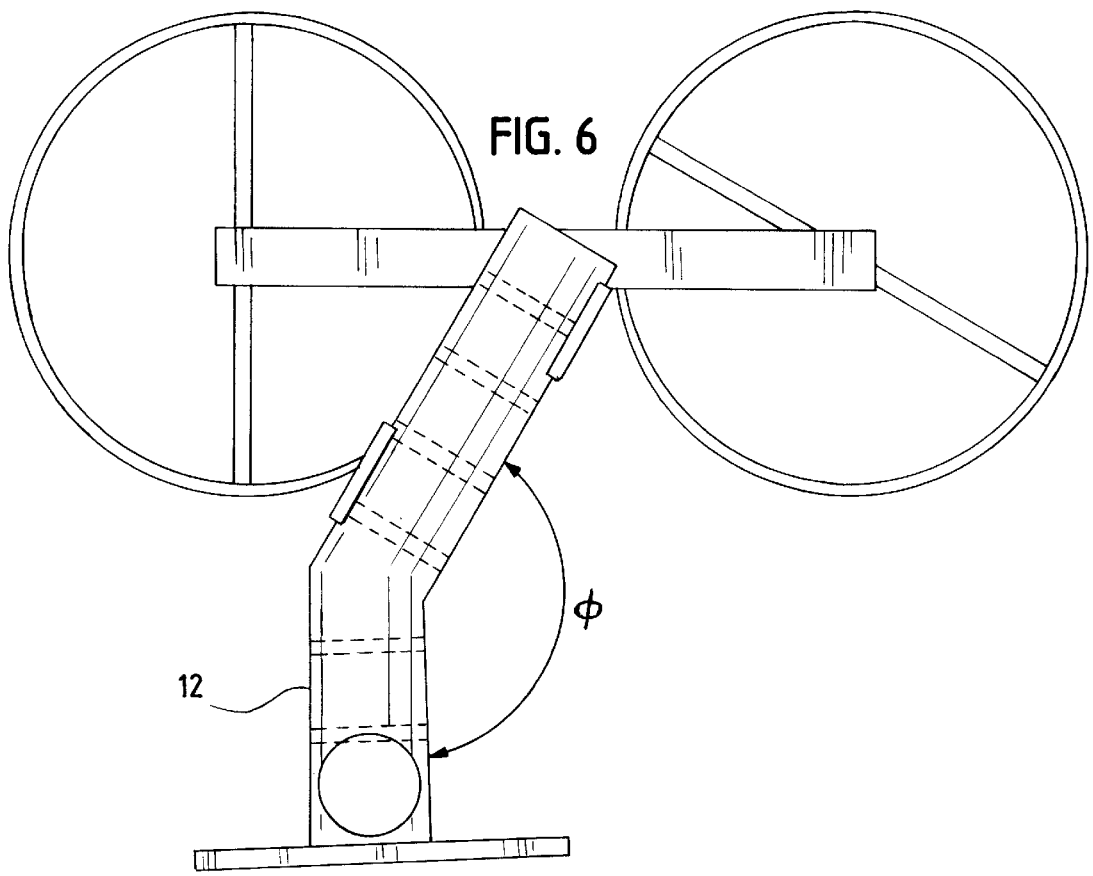
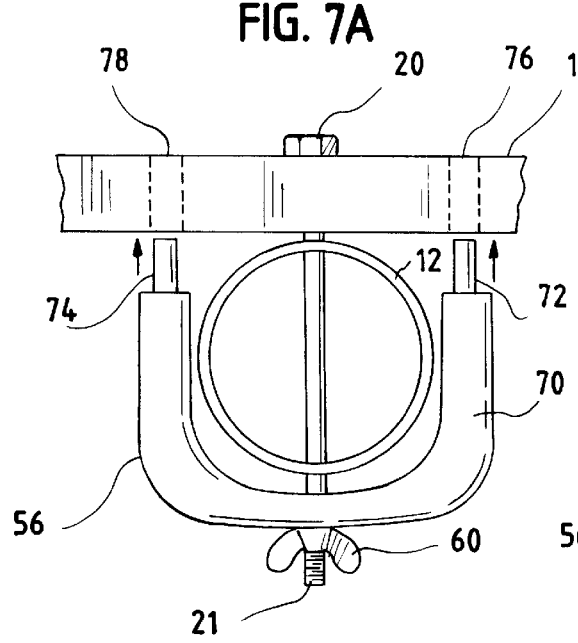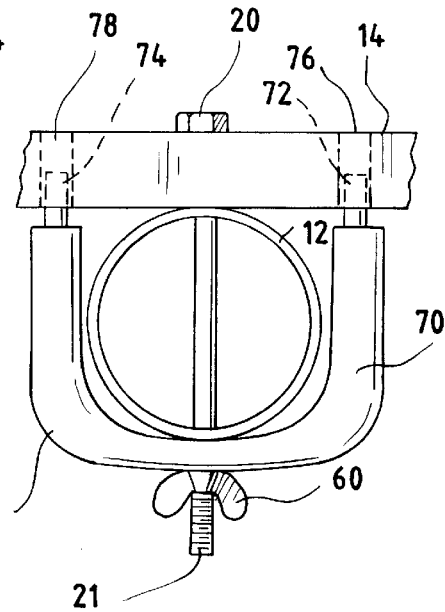

US 6,412,443 B1

DOUBLE PET WHEEL ACTIVITY DEVICE

FIELD OF THE INVENTION

The present invention relates to an activity device for small animals and more particularly to an activity device for hamsters, gerbils, mice and other small animals employing multiple rotating play elements.

BACKGROUND OF THE INVENTION

All animals need exercise and mental stimuli to remain vibrant and healthy. Current small animal activity devices for hamsters, gerbils, mice and other small animals include hamster wheels, hamster balls, and multiple level cage systems. Such devices typically provide the animal with exercise while simultaneously providing the animal's owner with enjoyment as he watches the pet play in the ball, wheel, or cage systems.

These conventional devices have existed in their present form for many years, and the field is ripe for a new approach to small animal activity devices. It is therefore the object of this invention to provide a new small animal activity device that provides small animals with improved physical exercise and mental stimulus while providing the pet owner with enhanced enjoyment as he watches his pet at play.

SUMMARY OF THE INVENTION

The small animal activity device of the present invention comprises a support member having a pivot and at least one arm mounted at its center to the pivot for rotation. Two play elements are in turn rotatably mounted on the arm on opposite sides of the pivot.

In a preferred embodiment, the support member is generally straight and projects generally vertically from a horizontal surface such as the bottom of a cage. In alternative embodiments, the support member may be mounted at various angles to appropriate supporting surfaces. Additionally, the support member need not be straight, but rather may provide a non-linear and even circuitous pathway for leading the small animals into the play elements.

In another preferred embodiment, the arm will comprise a plurality of arm segments of generally equal length projecting in opposite directions from the pivot. In this embodiment, play elements are rotatably mounted to the distal ends of the arm segments.

In a further preferred embodiment of the present invention, the interior of the support member includes a passageway for directing the small animals to the play elements. Indeed, in a particularly preferred embodiment the support member is tubular and the passageway comprises its interior. In either case, the passageway will have at least one portal near the base of the support member enabling the small animals to enter the passageway and at least one portal adjacent to the pivot enabling the small animals to exit the passageway onto the arm or to a play station. Additionally, it is preferred that the passageway include ribs to facilitate travel of the small animals through the passageway.

The play elements of the present invention include, for example, hamster playwheels or transparent hamster balls, rotatably mounted to the ends of the arm.

Finally, the activity device may include means for maintaining the arm in a fixed position. This may include mounting the arm to the support member with a threaded axle and fixing the arm place by tightening a wing nut.

The small animal activity device of the present invention is designed to be used with one or more small animals such as hamsters, gerbils, or mice. The small animals are physically exercised by climbing up the passageway, running between the play elements on the arm, and running in the play elements. Additional mental stimulation may be provided when more than one small animal uses the device. When multiple animals are present, each animal must navigate the passageway and cross the arm in the presence of other animals.

The small animal activity device of the present invention also provides the pet owner with enhanced enjoyment over previously available pet exercise devices. The pet owner is able to watch his pet become more active in the presence of the multiple forms of physical and mental stimulus the device provides. Additionally, when multiple pets are using the device and the arm is unlocked, the member will orbit or teeter back-and-forth.

BRIEF DESCRIPTION OF DRAWINGS

FIGS. 2A–C are front elevation views of the animal activity device with the pivoting member at the horizontal, intermediate, and vertical position in its path of rotation;

FIGS. 4A–C are front elevation views of the animal activity device with alternative means of directing the small animals onto the play elements;

FIG. 5A is a vertical sectional view of the support member of the animal activity device of FIG. 1 taken along lines 5"—5" in that figure showing the locking mechanism and internal structures of the support member;

FIG. 5B is a partial top view of the support member of the animal activity device of FIG. 1 showing the support member, arm and locking mechanism;

FIG. 6 is a front elevation view of an alternative embodiment of the animal activity device of the present invention;

FIGS. 7A–B are partial top views of an alternative locking mechanism shown in the disengaged position (FIG. 7A) and engaged position (FIG. 7B);

DETAILED DESCRIPTION OF DRAWINGS

Figure 1:
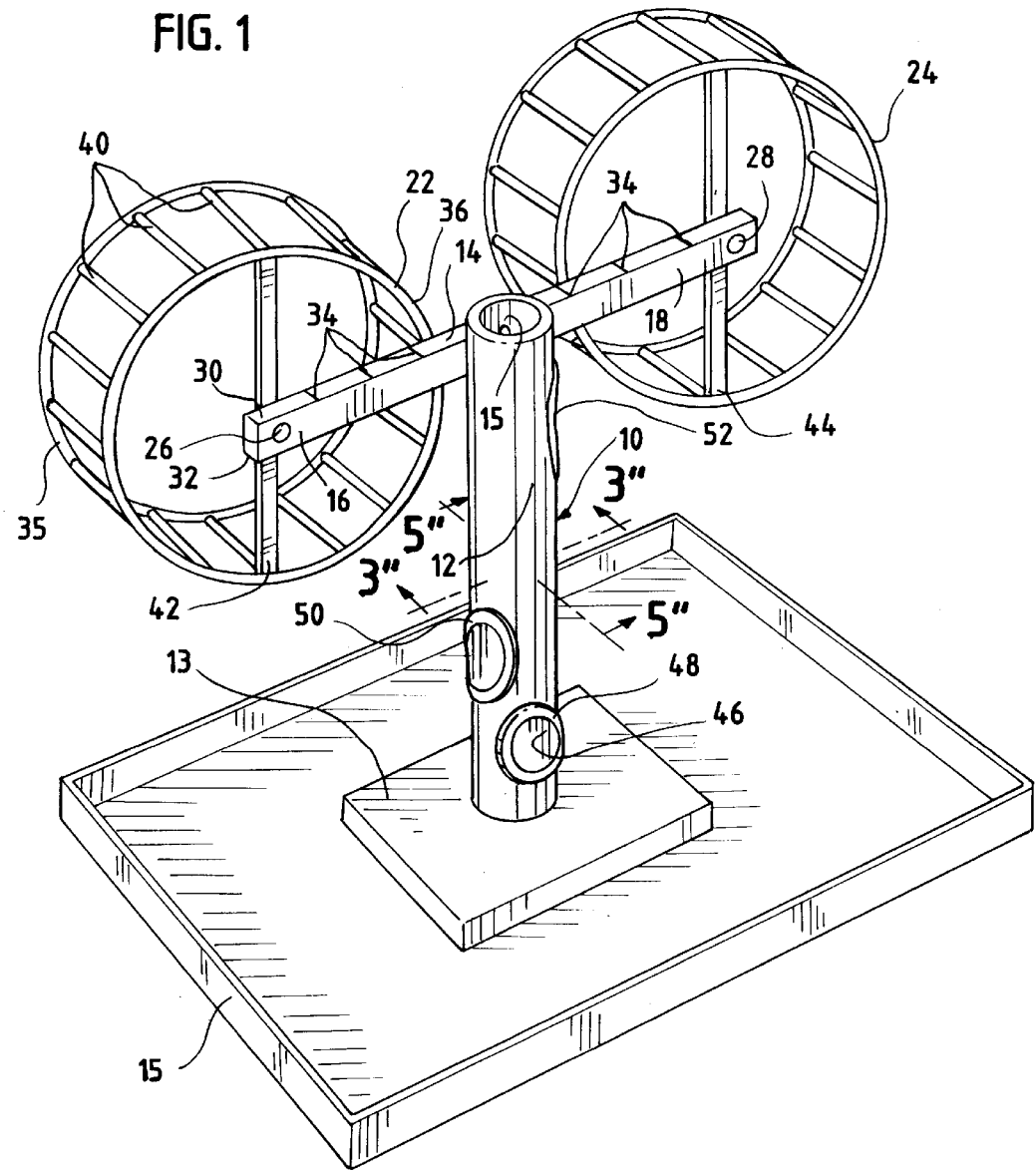
FIG. 1 is a perspective view of a preferred embodiment of the animal activity device of the present invention.
Figure 3:
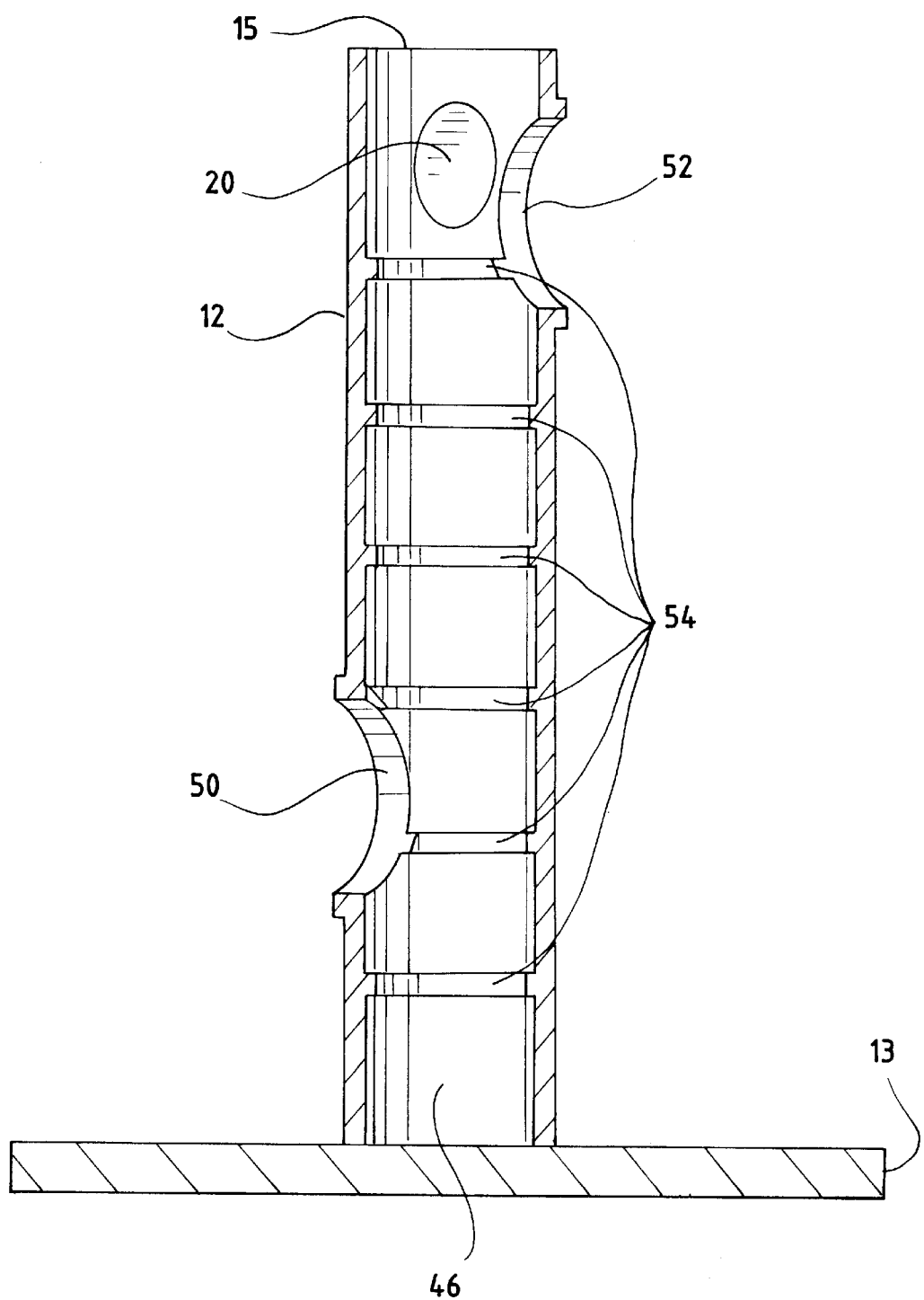
FIG. 3 is a vertical sectional view of the support member of the animal activity device of FIG. 1, taken along lines 3"—3" in that figure, showing the internal structures of the support member.

In accordance with a preferred embodiment of the present invention, FIGS. 1–5B shows a small animal activity device 10 in accordance with the present invention. Device 10 includes a support member 12 having pivot 20 and arm 14 mounted for rotation about pivot 20 (FIGS. 5A–B). First and second play elements, 22, 24 are rotatably mounted to the distal ends of arm 14 on pivots 26 and 28.

Arm 14 comprises first and second arm segments 16, 18 lying on a straight line and projecting in opposite directions from pivot 20. Located on the first and second opposing faces 30, 32 of arm segments 16, 18 are ribs 34 providing the small animals with traction as they run across arm 14. In other embodiments of the present invention, any means of providing traction on the arm segments may be employed. These means may include a rubberized coating, rubber dots randomly placed or patterned, or a roughened arm surface. Arm 14 may be made of molded plastic with pivots 26 and 28 molded into arm 14 during manufacture.

In the embodiment of FIG. 1, first and second play elements 22, 24 are rotatably mounted at the distal ends of the first and second arm segments 16, 18 at their respective pivots 26, 28. In this embodiment, first and second play elements 22, 24 are standard hamster playwheels composed of first and second hoop components 36, 38 connected to each other by a plurality of rungs 40. Rungs 40 define the interior portion of the first and second playwheels. The playwheels attach to arm 14 at the midpoint of the first and second playwheel support bars 42, 44. In another embodiment of the present invention, as seen in FIG. 9, play elements 22, 24 comprise transparent plastic hamster balls rotatably mounted at the distal ends of arm 14 at pivots 26, 28 in a similar manner to the hamster playwheels. The small animals enter and exit the hamster balls through portals 96, 98.

Support member 12 is a generally straight structure having a base 13 that rests on a horizontal surface, such as the bottom 15 of a cage (not shown), and projects in a generally vertical direction from the horizontal surface. In the embodiment of FIG. 1, support member 12 is a hollow, tubular structure. In other embodiments, support member 12 may have a cross-section of a variety of shapes and sizes, including triangular or square. Passageway 46 in the interior of support member 12 provides means for directing small animals to play elements 22, 24. The interior walls of support member 12 contain equally-spaced, circumferential, horizontal ribs 54 to aid the small animals in climbing through the interior of support member 12. Preferably, the interior diameter of support member 12 is approximately 3" and the ribs 54 will be spaced about 1" apart.

Figure 4A:
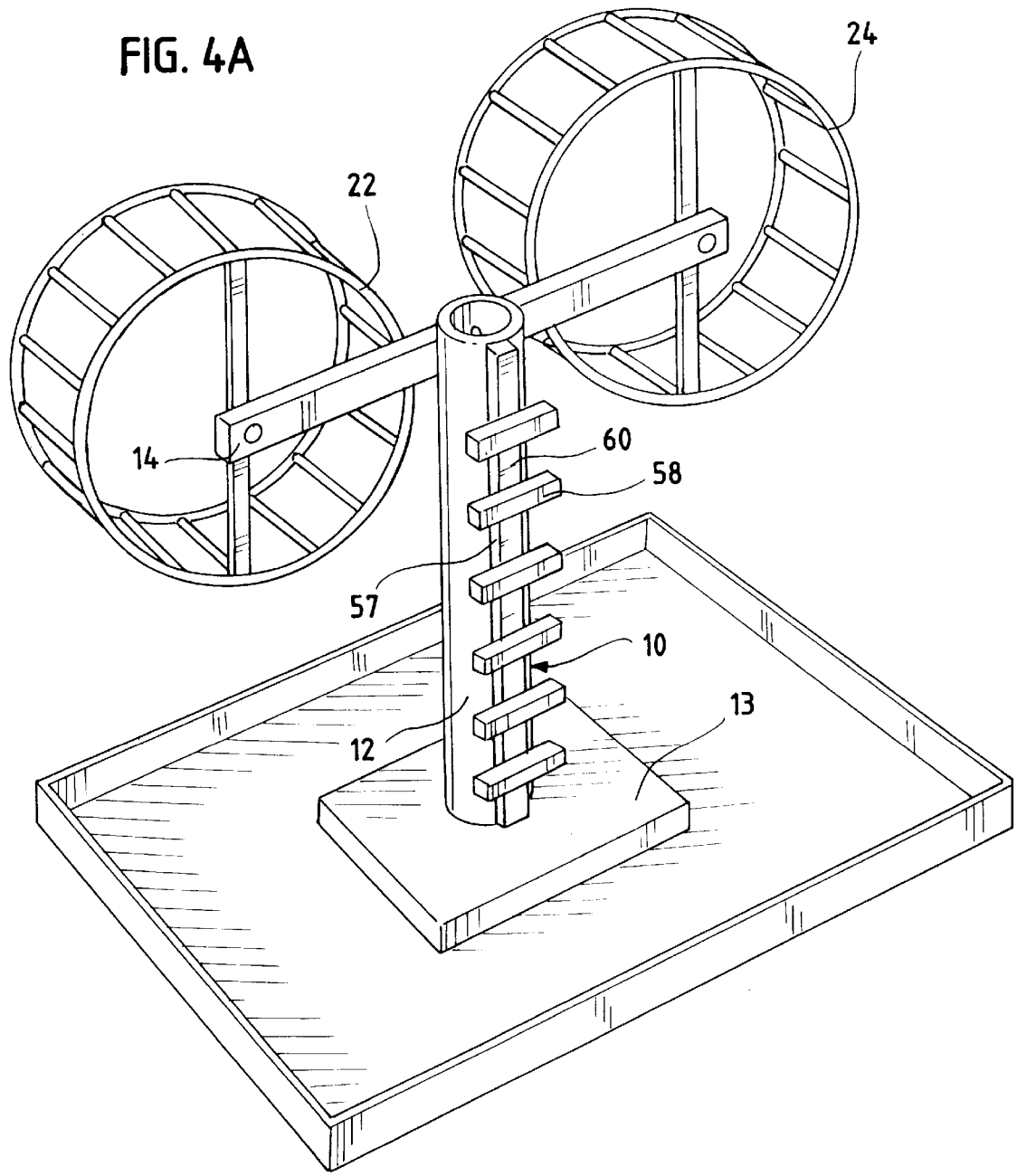

Referring now to FIGS. 4A–B, other means for directing the small animals to the play elements may include a ladder-like structure 57 with horizontal rungs 58 attached to a vertical member 60, where the ladder 57 is vertically fixed to support member 12, as in FIG. 4A, or angled, as in FIG. 4B. Additionally, the means for directing the small animals to the play elements may include ribs 62 on the exterior walls of support member 12, as in FIG. 4C.

Support member 12 may also take on many shapes and sizes. In an alternative embodiment, shown in FIG. 6, support member 12 is bent forming angle $\phi$. Angle $\phi$ can range from approximately 0° to 180°.

Three portals 48, 50 and 52 are located in support member 12 and extend through to passageway 46, as best seen in FIGS. 1–2. Each portal is large enough for small animals, such as hamsters, gerbils or mice, to pass through it. In the preferred embodiment, the portals are circular and have a diameter of approximately 2". The portals may also be triangular, square, or any other geometric shape.

First portal 48 is located in the bottom portion of support member 50 above base 13 allowing the small animals to enter passageway 46. Second and third portals 50, 52 are positioned at elevations allowing the small animals to exit passageway 46 to a play station or to arm 14 as arm 14 rests in different positions.

Additionally, the open-ended top portion of support member 12 defines top portal 15. Portal 15 provides the small animals with an additional exit from passageway 46 onto arm 14 when arm 14 is fixed in a horizontal or approximately horizontal position (FIGS. 2A–B).

When arm 14 is in a horizontal position, as in FIG. 2A, the small animals climb up passageway 46 and exit through a third portal 52 to play station 24. The small animals may also exit passageway 46 onto arm 14 through third portal 52 or top portal 15 when arm 14 is in a horizontal position or a position between horizontal and vertical, as seen in FIG. 2B.

When arm 14 is in a vertical position, as in FIG. 2C, the small animals climb up passageway 46 and exit through second portal 50 to play station 22 or exit through top portal 15 to play station 24.

Any number of entrance and exit portals may be employed allowing the small animals to enter and exit the passageway at a variety of locations.

Referring to FIG. 5, locking mechanism 56 for fixing arm 14 in a stationary position is illustrated. Locking mechanism 56 comprises pivot 20 extending through a bore in the side of support member 12, washers 62 and 64, and wing nut 60 attached to the threaded end 21 of pivot 20. The length of pivot 20 is less than the inner diameter of support member 12 to enable simple assembly of the structure.

Locking mechanism 56 engages by tightening wing nut 60 onto the threaded end 21 of pivot 20. Washers 62, 64 prevent the exterior surfaces of support member 12, pivoting member 14 and wing nut 60 from directly contacting each other causing excess wear to arm 14. When locking mechanism 56 is in the unlocked position, arm 14 is free to orbit in the vertical plane or to teeter back-and-forth.

Referring now to FIGS. 7A–B, an alternative embodiment of locking mechanism 56 is shown. In this embodiment, pivot 20 extends through arm 14, through bores on opposing sides of the upper portion of support member 12, and through horseshoe shaped member 70. Wing nut 60 tightens onto the threaded end 21 of pivot 20. Locking pegs 72, 74 extend from the ends of horseshoe 70 into corresponding bores 76, 78 in arm 14.

In operation, horseshoe 70 is aligned such that locking pegs 72, 74 fit into bores 76, 78 in arm 14 (FIG. 7B). Wing nut 60 is tightened onto threaded end 21 of pivot 20, holding horseshoe 70 securely in place. Engaging locking mechanism 56 holds arm 14 stationary in a horizontal position.

Figure 8A:
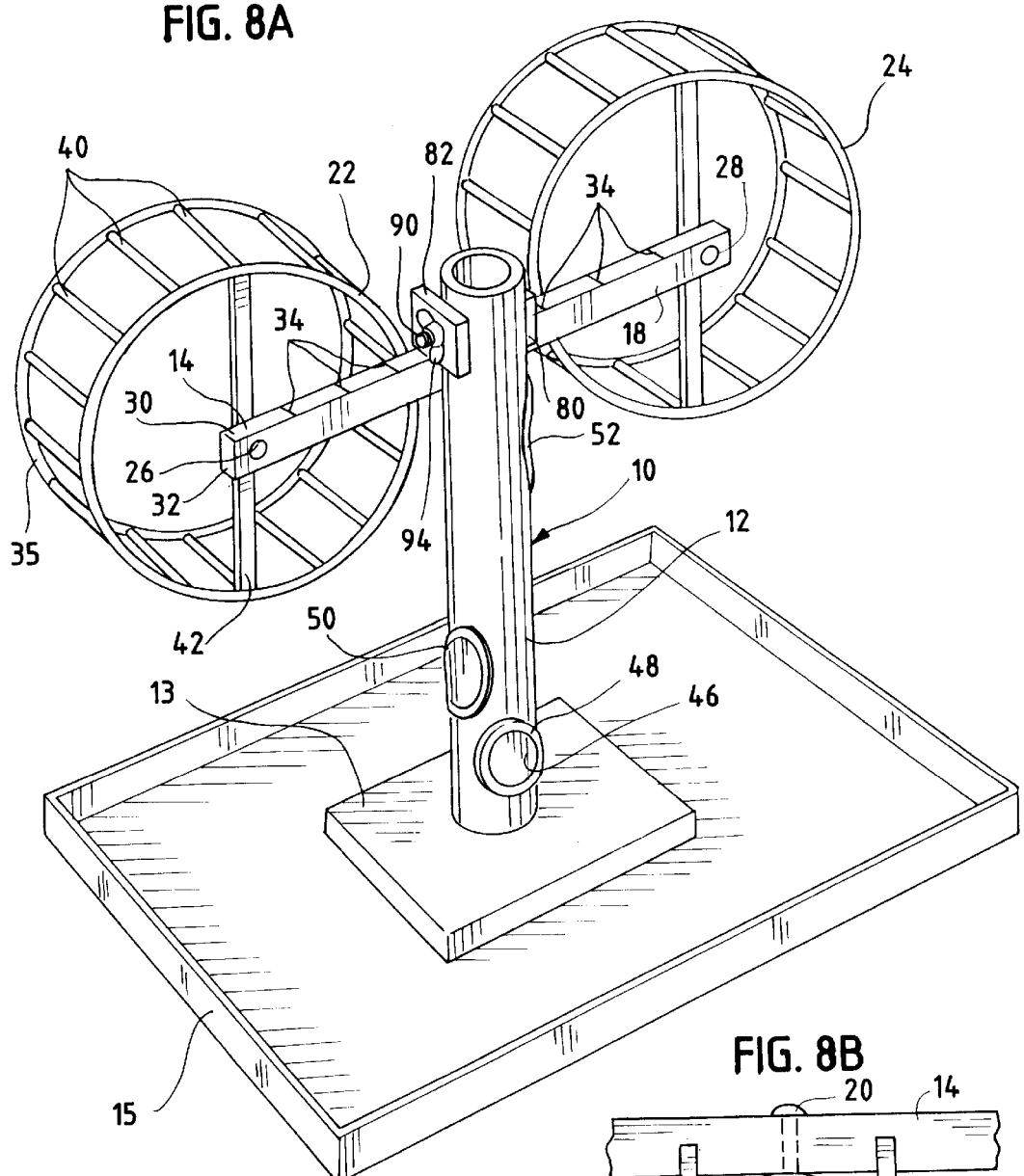
FIG. 8A is a perspective of the animal activity device of the present invention showing an alternative locking mechanism.
Figure 8B:
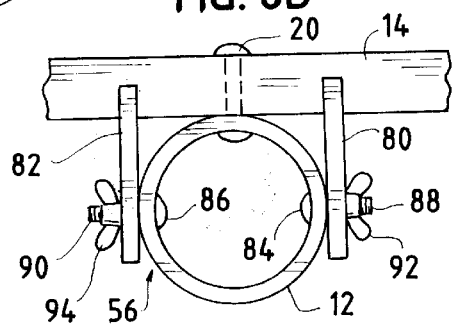
FIG. 8B is a partial top view of the locking mechanism of the animal activity device shown in FIG. 8A.

In yet another embodiment, shown in FIGS. 8A–B, another locking mechanism is shown. In this embodiment, threaded axles 84, 86 extend from the interior of support member 12 through bores in the sides of support member 12, and through locking arms 80, 82. Wing nuts 92, 94 engage the threaded ends 88, 90 of axles 84, 86. In operation, locking arms 80, 82 are aligned to contact the top face of arm 14. Wing nuts 92, 94 are tightened holding the locking arms in place and fixing arm 14, in a horizontal position.

In operation, one or more small animals enter the interior of support member 12 through first portal 48, climb up the interior of support member 12 aided by horizontal ribs 54 and either exit through second portal 50 to a play station or exit through third portal 52 onto play station 22 or arm 14 which directs the small animals to first or second play station 22, 24. As the small animals run in play elements 22, 24, the play elements will rotate.

Engaging locking mechanism 56 fixes arm 14 in a stationary position. Ribs 34 on arm 14 aid the small animals in moving back and forth between first and second play elements 22, 24 by providing traction for the animals, thus preventing them from slipping and falling off arm 14.

Disengaging locking mechanism 56 allows arm 14 to orbit or teeter back-and-forth as one or more animals play in first and second play elements 22, 24. Where one animal is heavier than the other in the multiple animal situation, thus causing one play station to be weighed down at the bottom of arm's path of orbit, the pet owner may give the arm 14 a push to restart the orbiting or teetering motion.

There has been described, with reference to a specific exemplary embodiment thereof, an activity device for small animals, such as hamsters, gerbils, mice. It will be apparent to those skilled in the art that modifications may be made without departing from the spirit and scope of the invention. All modifications are to be considered within the sphere, spirit, and scope of the invention as set forth in the following claims.

What is claimed is:

1. An activity device for one or more small animals comprising:

a support member having a pivot;

at least one arm including a plurality of segments projecting radially from the pivot, mounted at its center to the pivot for rotation thereabout; and small animal play elements rotatably mounted to the arm on either side of the pivot, near the distal ends of the segments.

2. The activity device of claim 1 wherein the support member is generally vertical.

3. The activity device of claim 1 further comprising means for directing the small animals into play elements.

4. The activity device of claim 3 wherein the support member is hollow and comprises the means for directing small animals to the play elements, the interior portion of the support member having at least one portal near the base of the support member, enabling the small animals to enter the support member, and at least one portal adjacent to the pivot, enabling the small animals to exit the support member onto the arm or to one of the play elements.

5. The activity device of claim 4 wherein the interior of the support member includes ribs to facilitate travel of the small animals through the support member.

6. The activity device of claim 1 including means for maintaining the arm in a stationary position.

7. The activity device of claim 1 wherein the play elements comprise small animal playwheels.

8. The activity device of claim 1 wherein the play elements comprise hollow balls with at least one portal for the small animal to enter and exit the ball.

9. An activity device for one or more small animals comprising:

a generally vertical tubular support member with a pivot;

at least one arm rotatably mounted to the support member at the pivot, the arm comprising a plurality of segments extending radially from the pivot;

play elements rotatably mounted at to the distal ends of the arms segments;

a passageway comprising the interior of the tubular support member for directing the small animals onto the play elements;

ribs on the interior of the tubular support member to facilitate travel of the small animals through the passageway;

portals to enable small animals to enter and exit the passageway; and means for maintaining the arm in a stationary position.

* * * * *